United States Patent [19]

Takasaki et al.

[11] Patent Number: 5,278,922
[45] Date of Patent: Jan. 11, 1994

[54] METHOD FOR RE-TRACING THE END POINT OF AN IMAGE

[75] Inventors: Naruto Takasaki; Yutaka Tanaka, both of Yokohama, Japan

[73] Assignee: Hitachi Software Engineering Co., Ltd., Yokohama, Japan

[21] Appl. No.: 753,992

[22] Filed: Sep. 3, 1991

[30] Foreign Application Priority Data

Sep. 3, 1990 [JP] Japan .................................. 2-232665

[51] Int. Cl.⁵ .............................................. G06K 9/30
[52] U.S. Cl. .......................................... 382/60; 382/22
[58] Field of Search ........................................ 382/22, 60

[56] References Cited

U.S. PATENT DOCUMENTS 3,671,936  6/1972  Takahashi et al. ..................... 382/60
4,956,869  9/1990  Miyatake et al. ..................... 382/60

*Primary Examiner*—Leo H. Boudreau
*Attorney, Agent, or Firm*—Fay, Sharpe, Beall, Fagan, Minnich & McKee

[57] ABSTRACT

A method for re-tracing an end point of an image by an image processing device for converting the line images of the image data into vector data in a semi-automatic way by tracing plural line images and converting them into one vector data. The method for re-tracing the end point of the image involves tracing the line images by transferring the tracing points on the line images and continuing the previous trace processing for re-tracing the line image which follows by waiting for an instruction to re-trace from the input unit and entering the instruction to re-trace the image specified for re-tracing when the tracing point has reached the end point of the line image whose tracing points have been traced.

11 Claims, 4 Drawing Sheets

METHOD FOR RE-TRACING THE END POINT OF AN IMAGE

BACKGROUND OF THE INVENTION

The present invention relates to a method for re-tracing the end point of an image and, more particularly, to a method for re-tracing the end point, or a terminal point, of the image, which can be utilized for image processing devices, such as a CAD (computer-aided design) machine and so on, preferably in semi-automatically tracing line images of image data and which is so adapted as to continuously re-trace the end point of the image which follows the end point of the previously traced image.

Heretofore, the method for the input of a drawing drawn on paper into an image processing system generally comprises inputting of the drawing as image data by an image scanner or the like, displaying the image data on a display screen by an image processing system, and tracing the image by allowing the operator to manually specify the tracing points on the image with a pointing device or the like while viewing the images on the display screen.

For example, the method for the input of a drawing in a conversational mode as disclosed in Japanese Patent Laid-open Publication (kokai) No. 269,276/1987 involves entering the drawing into a computer system as image data through a scanner, superimposing the resulting image data on center-line image data on the display screen, and entering the drawing as vector data representing the drawing with coordinate points by specifying necessary positions of the drawing on the display screen with a coordinate pointer.

For example, when the image data is converted into graphic data such as vector data, etc. as described hereinabove, central data on the center or the center line of the image is given, data on necessary characteristic points of the continuous image, such as end points, branch points, corner points, etc. is selected and specified from the center line of the continuous central data, and such data is entered. In this case, in order to enter the characteristic points, the central data is superimposed on the image data on the display screen to allow the operator to judge the characteristic points with ease, and the characteristic points are entered manually by the operator. Hence, this input method suffers from the disadvantage that the display screen becomes so complex that the operator cannot select the necessary data with high efficiency.

On the other hand, there has been developed an image processing device with a semi-automatically image-trace processing function that traces image points in a semi-automatic way, determines the characteristic points, and enters graphic data of the characteristic points. For such a semi-automatically image-trace processing function of the image processing device, only one line image as an object for conversion into vector data can be traced by tracing the line images upon one instruction to start tracing.

Therefore, when the line images, such as contour lines of a map graphic, etc., are traced in a semi-automatic way by taking advantage of the semi-automatically image-trace processing function of the image processing device, the continuity of the line images (a continuous pixel sequence) of the contour lines is disconnected, when there is an image, such as numeral font data which represents height between the line images and which does not comprise any line image, so that the tracing cannot be performed in a continuous fashion and the line images cannot be converted into one vector data. In other words, even if the line image composed originally of one line would be divided into plural line images, it cannot be converted into one vector data.

SUMMARY OF THE INVENTION

Therefore, the object of the present invention is to semi-automatically re-trace the end point of an image by an image processing device, to trace plural line images continuously and convert them into one vector data.

In order to achieve the aforesaid object, the present invention re-traces the end point of an image by an image processing device having an image memory for storing image data, a data memory for storing graphic data, a display unit for displaying the image data and the graphic data, an input unit for giving an instruction to start tracing, and a semi-automatically image-trace processing section for semi-automatically tracing line images of the image data through the instruction to start tracing, and by processing which comprises: tracing a current line image by transferring tracing points on a current line image, waiting for an instruction to start re-tracing when the tracing point of the current line image has reached its end point, and re-starting tracing of the image by continuing the trace for an adjacent line image by input of the instruction to start re-tracing the image from the input unit.

The semi-automatically image-trace processing section in the image processing device traces the line images of the image data in a semi-automatic way by entering the instruction to start tracing the image specified as an object to trace. The processing for tracing the line images of the image data is performed by transferring the tracing points on the line images. When the tracing point has come to the end point of the current line image, the current processing for tracing the current line image has finished and the instruction to start re-tracing is awaited from the input unit. As the instruction to start re-tracing the image specified is entered from the input unit, the previous processing for tracing the line image is re-started for tracing the next adjacent line image which follows.

This operation allows the line images divided originally from one vector data to be traced in a continuous manner as if one line image is traced, thereby converting the line images into one vector data.

As described, the tracing points of the next line image traced can be entered as polygonal data input as a continuation of the trace data (tracing points) for the previous line image; herein this is referred to as re-tracing the line image from its image end point in order to perform the trace processing by transferring from the end point of the previous line image to the end point of the next adjacent line image which follows. Further, when another line image is specified as the line image to be re-traced, the another line image can be re-traced as a continuation of the previous trace data. In other words, it is to be noted that a point for starting re-tracing is detected and then the tracing is resumed from the point for starting re-tracing as a continuation of the previous trace data. Hence, even if the image data originally representing one continuous line data has been divided, it can be converted into one line data with high accuracy.

DESCRIPTION OF THE PREFERRED EMBODIMENTS

Figure 1:
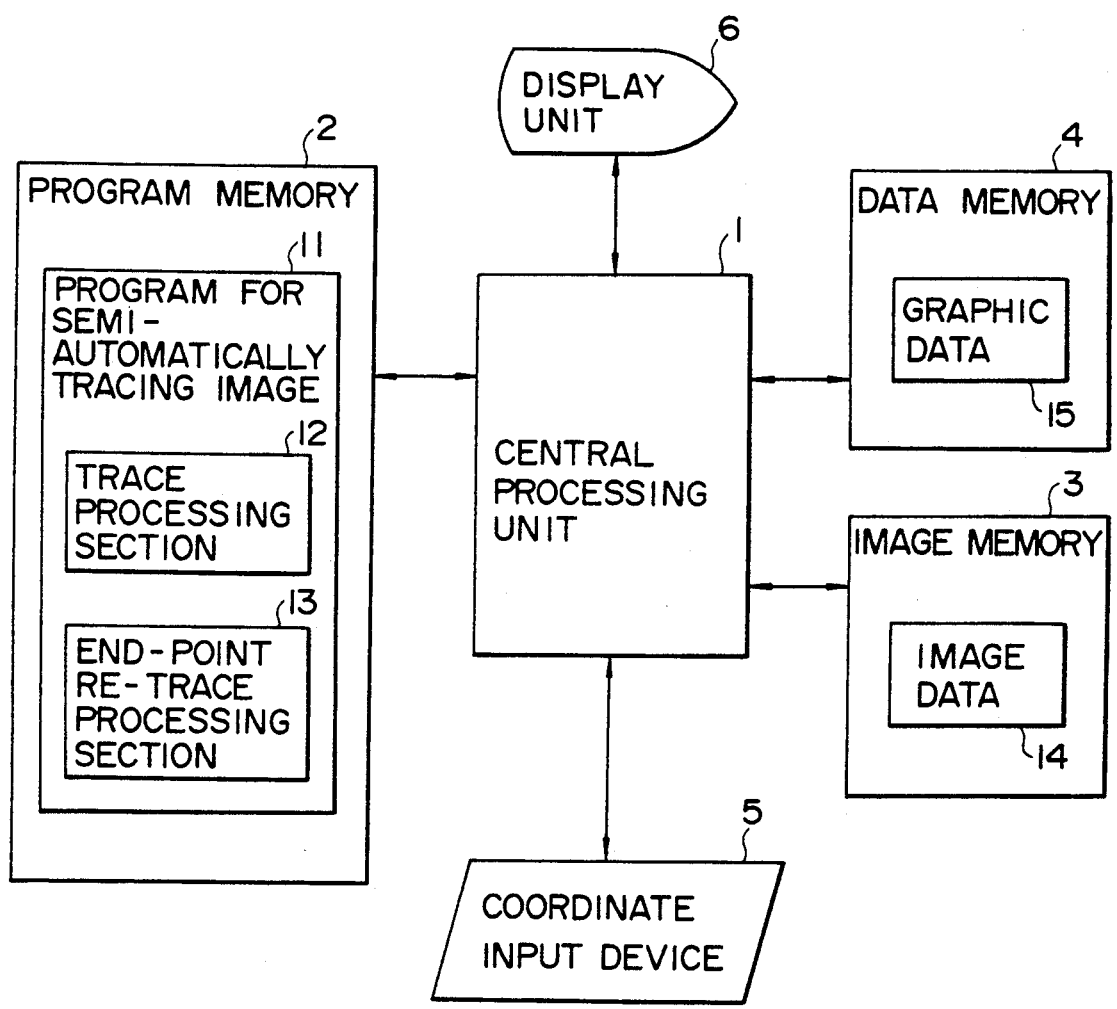
FIG. 1 is a block diagram showing the configuration of the image processing device of an embodiment according to the present invention.

FIG. 1 is a block diagram showing the configuration of the image processing device for the embodiment of the present invention. The image processing device comprises a central processing unit 1 for performing various processing, a program memory 2 for storing a program necessary for the processing by the central processing unit 1, an image memory 3, a data memory 4, a coordinates input device 5 and a display unit 6 for displaying on its display screen.

The program memory 2 stores a program 11 for semi-automatically tracing images and the program 11 therefor contains a subprogram for a trace processing section 12 for performing the processing for tracing line images and an end-point re-trace processing section 13. In the image memory 3 is stored image data 14 containing line images as the object for tracing. The data memory 4 stores graphic data 15 as digitized results of tracing the line images and converting the line images into graphic data, for example vector data. As the coordinates input device 5, there may be employed a pointing device such as a mouse, a trace ball, etc. and data of the coordinates at the cursor position on the display screen of the display unit 6 is entered. Further, the coordinates input device 5 is employed together with output of the display screen of the display unit 6 and as a device for entering an instruction for input in an interactive mode from the operator.

In the image processing device having the configuration as described hereinabove, the trace processing section 12 of the semi-automatically image tracing program 11 performs the trace processing for tracing continuous black pixel sequences for the line images of the image data 14 of the image memory. In the trace processing for tracing the line images by the trace processing section 12, the line images of the image data as the object to trace are displayed on the display screen of the display unit 6 and the instruction to start tracing the image specified for re-tracing is given by the coordinates input device 5, thereby starting tracing the line images in a semi-automatic fashion. The processing for tracing the line images is performed by tracing the continuous black pixel sequences as tracing points of the line images and by transferring the tracing points (trace data) one after another. When the tracing point has reached the end point P1 of the line image 31 traced, then the processing of section 12 for tracing the line image is suspended temporarily without finishing the trace processing for tracing the previous line image 31 of FIG. 3a and the end-point re-trace processing section 13 takes over the processing. Then, the end-point re-trace processing section 13 performs the processing for re-tracing the end point P3 of the line image 33 which follows. In the processing for tracing the end point P3 of the line image 33 which follows, first, input of the instruction to start re-tracing is awaited from the coordinates input device 5. As the instruction to start re-tracing is entered from the coordinates input device 5 by specifying the image to be re-traced by specifying a position on the display screen, the image to be re-traced is determined, thereby continuing the trace processing from the previous trace processing to trace the image determined to be re-traced. In other words, the end-point re-trace processing section 13 is to resume the temporarily suspended trace processing of section 12 by detecting the end point P3 of the line image 33 which follows and to perform re-tracing by continuing the trace processing by specifying the line image 33 to be re-traced. The data obtained by performing a series of continuous trace processing is converted into one vector data i.e. vector data for one line image including 31, 33.

Figure 2:
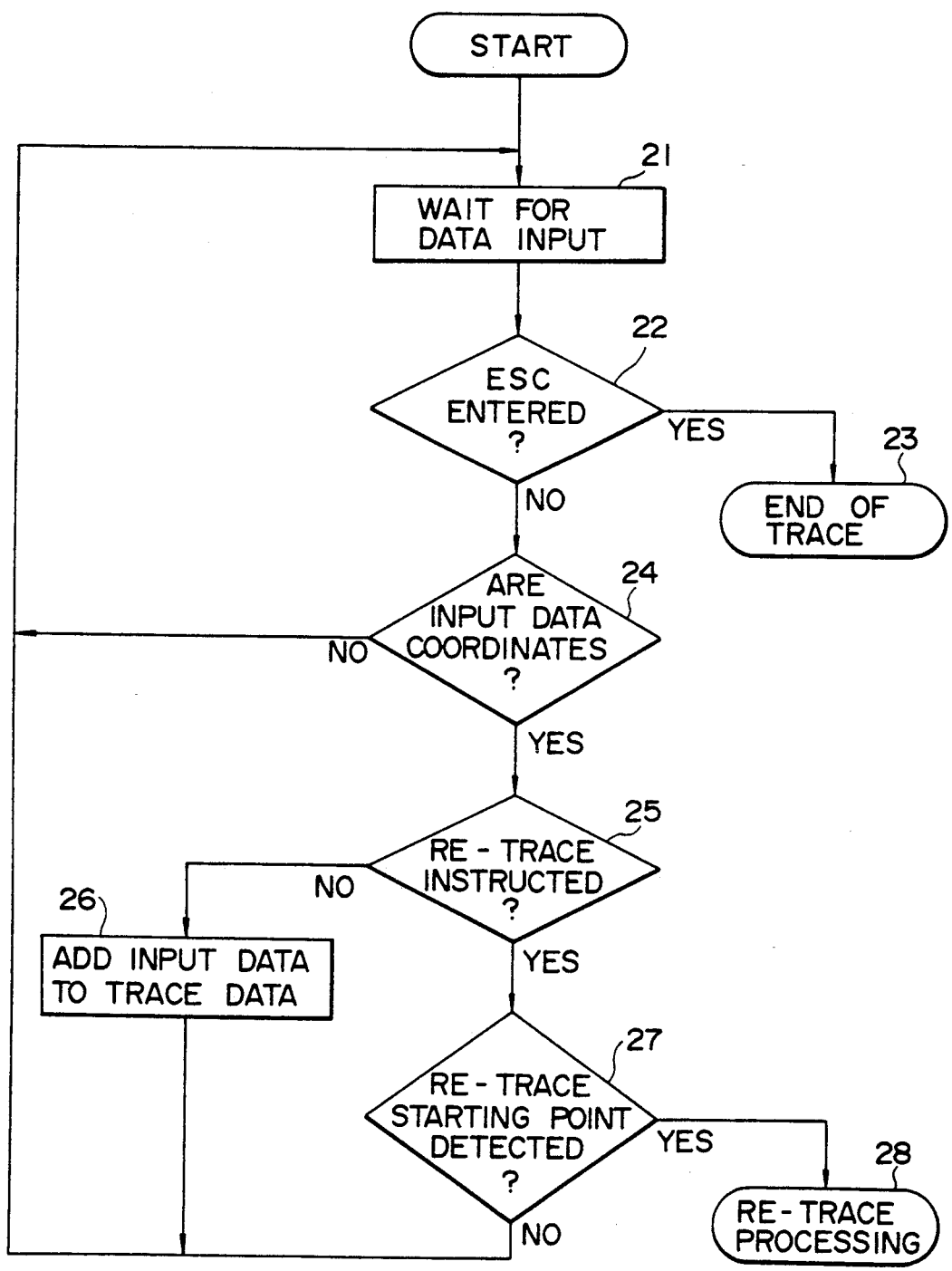
FIG. 2 is a flow chart showing an example of the processing for tracing the end point of an image according to the present invention.

FIG. 2 is a flow chart showing an example of the processing for re-tracing the end point of the image. FIGS. 3a, 3b, 4a and 4b are schematic representations for the description on the processing for re-tracing the end point of the image. Description will now be made of the processing for re-tracing the end point of the image in accordance with the flow chart of FIG. 2 with reference to FIGS. 3a and 3b.

Figure 3A:
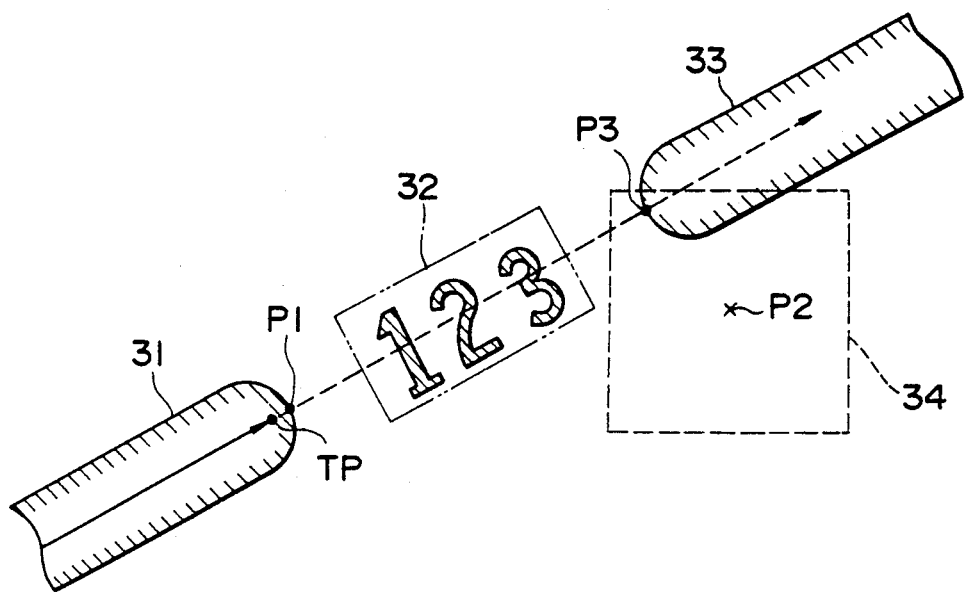
FIGS. 3a, 3b, 4a and 4b are schematic illustrations for describing the operation for re-tracing the end point of the image.

As shown in FIG. 3a, the image of the image data 14 displayed on the display screen of the display unit 6 comprises, for example, a line image 31, a font image 32 representing a numeral, and a line image 33. By the trace processing for tracing the line image 31 up to the end point P1, it is determined that the tracing point TP has reached the end point P1. As the tracing point TP has reached the end point P1, the black pixel line which follows cannot be traced in a continuous manner so that the end-point re-trace processing section 13 is started to resume the processing for tracing the end point of the line image which follows.

In the processing for tracing the end point of the line images, first, at step 21, the input of data is awaited and, as the data is entered by the operator, then the program flow goes to step 22 at which a decision is made if the input data is ESC (Escape). When it is decided at step 22 that the input data is ESC, then the program flow goes to step 23 at which no processing for re-tracing is performed, followed by the end of trace. When the result of a decision at step 22 indicates that the data is not ESC input, on the other hand, then the program flow goes to step 24 at which a decision is made if the input data are coordinates. When it is decided at step 24 that the input data are not coordinates, then the program flow is returned to step 21 at which the input of data is awaited. On the other hand, when the result of a decision at step 24 indicates that the input data are coordinates, then the program flow goes to step 25 at which a decision is made if the data on the coordinates value specified re-tracing. Whether or not the data on the coordinates value specified re-tracing is determined on the basis of additional information, such as determination of which button of the coordinates input device 5 is pressed. When it is decided at step 25 that the input data on the coordinates is not specified for re-tracing, namely, when it is decided that the coordinates are entered as a usual polygonal input, then the program flow goes to step 26 at which the input of the current coordinates data is added to the current trace data, followed by the return to step 21 at to await the input of data. When the result of the decision at step 25 indicates that the input of the coordinates data is specified for re-tracing, then the program flow advances to step 27 at which a decision is made if the re-trace starting point of the image to be re-traced can be determined from the input coordinates data. When no re-trace starting point can be detected at step 27, then the program flow returns to step 21 for awaiting the input of data because no processing is required to be performed and the input of the coordinates data is disregarded, followed by the return to step 21 to await input of data. When the re-trace starting point of the image to be re-traced is detected from the input of the coordinates data, then the program flow goes to step 28 at which the re-trace processing is performed by continuing the trace processing which has been performed for the previous line image. The re-trace processing at step 28 specifically involves finishing the processing by the end-point re-trace processing section 13, starting the trace processing section 12, and returning the processing by the image processing device again to the trace processing section 12, thereby re-tracing the line image from its re-trace starting point.

Figure 3B:
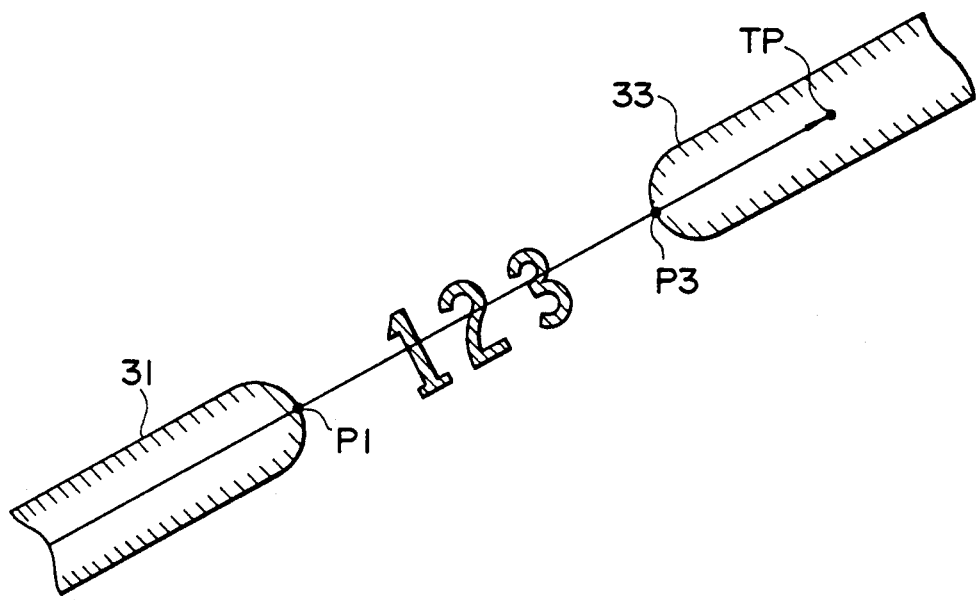

For instance, as shown in FIG. 3a, when the coordinates point P2 is specified as a point for specifying the re-tracing by the coordinates input device 5, the inside of a predetermined rectangular area 34 with the coordinates point P2 set as the center is searched to determine an image. A line image 33 is discriminated from other images from the direction of moving the tracing points for the previous trace processing of line image 31. As a result, the re-trace starting point P3 serving as an end point of the line image 33 is detected, thereby allowing the trace processing to be performed for the line image 33 as a continuation from the end point P1 of the previous line image 31. This procedure resumes tracing the adjacent line image 33 by following the trace processing for the line image 31 by transferring the tracing point TP to the line image 33, as shown in FIG. 3b.

Figure 4A:
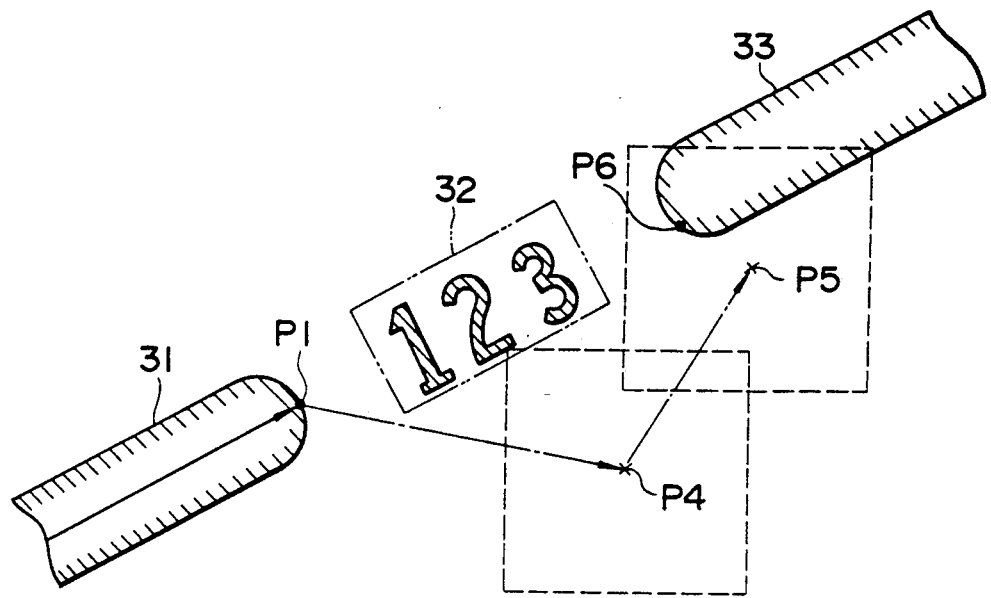
Figure 4B:
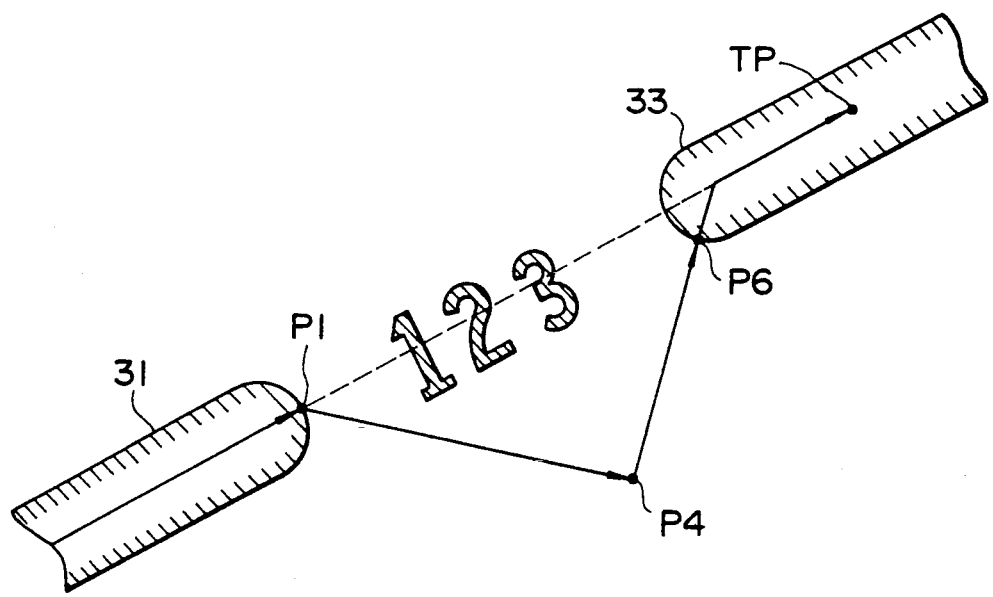

As shown in FIG. 4a, when the point P4 is entered through the coordinates input device 5 without being specified as the point for specifying the re-tracing, the point P4 is entered as coordinates of the polygonal input and added as trace data (a tracing point). Further, following point P4 the processing for re-tracing can be continued by specifying the next coordinates point P5 positioned by the cursor in the vicinity of the line image 33 in order to specify the line image 33 to be re-traced in substantially the same manner as described hereinabove with the coordinates point P2. This procedure allows the re-trace starting point P6 to be detected for the line image 33 and resumes the re-trace processing by using the coordinates point P4 as the point for the polygonal input as shown in FIG. 4b. The data (trace data) of the path of the tracing point TP traced in the manner as described hereinabove is determined for its characteristic points, such as end points, branch points, curved points, etc, and then converted into one vector data.

By the embodiment as described hereinabove, the divided line images originally from one vector data, such as a contour line drawing, can be converted into one continuous graphic vector data.

As described hereinabove, the present invention allows divided line image data to be converted into one vector data when the image is traced in a semiautomatic way by the image processing device. Hence, the image can be converted into vector data without breaking the original meaning of the drawing.

While a preferred embodiment has been set forth along with modifications and variations to show specific advantageous details of the present invention, further embodiments, modifications and variations are contemplated within the broader aspects of the present invention, all as set forth by the spirit and scope of the following claims.

What is claimed is:

1. The method for re-tracing the end point of an image, comprising:
    providing an image processing device having an image memory for storing image data, a data memory for storing graphic data, a display unit for displaying the image data and the graphic data, an input unit for user inputting an instruction to start, and a program for automatically tracing a line image of the image data in response to input of an instruction to start tracing and a trace starting point;
    user inputting the instruction to start:
    automatically tracing a first line image with the program in response to said user inputting an instruction to start tracing by transferring tracing points on the first line image to memory;
    suspending said tracing and waiting for inputting of an instruction to start re-tracing from the input unit, when the tracing point of the first line image has reached an end point of the first line image;
    user inputting an instruction to start re-tracing, from the input unit; and
    re-starting said tracing with respect to a second separate line image by continuing said transferring tracing points with respect to the second line image as tracing points of the first line image in response to said inputting of an instruction to start re-tracing the second line image from the input unit.

2. A method according to claim 1, further including converting a trace path defined by the tracing points of the first and second line images into vector data of a single line image.

3. A method according to claim 1, wherein said user inputting the instruction to start re-tracing is conducted by entering a coordinate position with the input unit, and including automatically determining the second line image as a line image with a fixed coordinate location relative to the coordinate position and having a line direction as a continuation of the line direction of the first line image.

4. A method according to claim 1, further including inputting through the input unit, polygonal input data as coordinates of a position as a continuation of a trace path of the first line image.

5. A method for tracing an image composed of at least two line images separated from each other by a gap, comprising the steps of:
    inputting an instruction to trace and a trace starting point with respect to one of the line images;
    in response to said inputting, automatically tracing the one of the line images to an end point of the one of the line images;
    in response to said tracing to the end point, suspending said tracing;
    inputting a tracing re-starting point with respect to a second of the line images;
    in response to said last mentioned inputting, automatically resuming said tracing with respect to the second of the line images;
    wherein said tracing of the one of the line images and the second of the line images includes storing a plurality of characteristic points defining a continuous pixel sequence substantially including the one of the line images and the second of the line images; and wherein said storing stores the characteristic points as graphic data of a single line image.

6. The method of claim 5, further comprising:

displaying the image on a display; and wherein said steps of inputting are performed by a user with an input unit.

7. A method for tracing an image according to claim 5, wherein said steps of inputting each includes manually determining location on the image as displayed on a display by a user.

8. A method for tracing an image according to claim 5, wherein said step of inputting the trace starting point automatically determines the trace starting point for each line image at substantially the center of a continuous black pixel sequence defined by a user.

9. A method for tracing an image according to claim 6, wherein said step of displaying displays a contour map having a plurality of separate topographical contour lines representing respective line images.

10. A method for tracing an image according to claim 9, including entering a height attribute for at least one of the contour lines;

automatically measuring the distance between traced lines within an image plane relative to the one of the contour lines and setting a height attribute to each traced line image based upon such distance and height attribute; and storing graphical representations of the traced contour lines together with a height attribute for each.

11. A method for tracing an image according to claim 5, wherein said step of tracing includes replacing the image data of the line images traced with graphic data.

* * * * *